(12) United States Patent
Jannard et al.

(10) Patent No.: US 9,906,764 B2
(45) Date of Patent: Feb. 27, 2018

(54) RESOLUTION BASED FORMATTING OF COMPRESSED IMAGE DATA

(71) Applicant: RED.COM, LLC, Irvine, CA (US)

(72) Inventors: James H. Jannard, Las Vegas, NV (US); Rob Wouter Lohman, Dana Point, CA (US); Richard Greene, Austin, TX (US)

(73) Assignee: RED.COM, LLC, Irvine, CA (US)

( * ) Notice: Subject to any disclaimer, the term of this patent is extended or adjusted under 35 U.S.C. 154(b) by 0 days.

(21) Appl. No.: 15/264,454

(22) Filed: Sep. 13, 2016

(65) Prior Publication Data
US 2017/0099475 A1     Apr. 6, 2017

Related U.S. Application Data

(63) Continuation of application No. 14/081,297, filed on Nov. 15, 2013, now Pat. No. 9,479,749, which is a
(Continued)

(51) Int. Cl.
*G06T 9/00*     (2006.01)
*H04N 7/26*     (2006.01)
(Continued)

(52) U.S. Cl.
CPC ............... *H04N 9/64* (2013.01); *G06T 9/005* (2013.01); *H04N 19/30* (2014.11);
(Continued)

(58) Field of Classification Search
None
See application file for complete search history.

(56) References Cited

U.S. PATENT DOCUMENTS

| 5,875,122 A | 2/1999 | Acharya |
| 6,124,811 A | 9/2000 | Acharya et al. |

(Continued)

FOREIGN PATENT DOCUMENTS

| JP | 2002-057903 A | 2/2002 |
| JP | 2003-125331 A | 4/2003 |

(Continued)

OTHER PUBLICATIONS

Office Action in European Application No. 10842625.5, dated Jul. 10, 2015 in 9 pages.
(Continued)

*Primary Examiner* — Matthew Bella
*Assistant Examiner* — Jose M Torres
(74) *Attorney, Agent, or Firm* — Knobbe, Martens, Olson & Bear LLP

(57) ABSTRACT

The disclosure herein relates to devices for compression, decompression or reconstruction of image data for still or moving pictures, such as image data detected with a digital camera. In some embodiments, data channels are compressed using a scalable compression algorithm. The compression algorithm may allow customization of compression parameters, such as a quantization factor, code block size, number of transform levels, reversible or irreversible compression, a desired compression ratio with a variable bit rate output, a desired fixed bit rate output with a variable compression rate, progression order, output format, or visual weighting. A lower quality image or an image with lower resolution may be reconstructed using only some of the compressed data. Use of offsets to various layers and color channels allow reconstruction of the image without requiring decompression of all of the full image data.

14 Claims, 14 Drawing Sheets

Related U.S. Application Data continuation of application No. 12/970,653, filed on Dec. 16, 2010, now Pat. No. 8,611,652.

(60) Provisional application No. 61/287,120, filed on Dec. 16, 2009.

(51) Int. Cl.

| | | |
|---|---|---|
| *G06T 1/60* | (2006.01) | |
| *H04N 9/64* | (2006.01) | |
| *H04N 19/46* | (2014.01) | |
| *H04N 19/30* | (2014.01) | |
| *H04N 19/63* | (2014.01) | |
| *H04N 19/423* | (2014.01) | |
| *H04N 19/436* | (2014.01) | |

(52) U.S. Cl.
CPC ......... *H04N 19/423* (2014.11); *H04N 19/436* (2014.11); *H04N 19/46* (2014.11); *H04N 19/63* (2014.11); *G09G 2340/02* (2013.01)

(56) References Cited

U.S. PATENT DOCUMENTS

| | | | |
|---|---|---|---|
| 6,154,493 | A | 11/2000 | Acharya et al. |
| 6,272,180 | B1 | 8/2001 | Lei |
| 6,549,674 | B1 | 4/2003 | Chui et al. |
| 6,778,709 | B1 | 8/2004 | Taubman |
| 6,798,901 | B1 | 9/2004 | Acharya et al. |
| 6,825,876 | B1 | 11/2004 | Easwar et al. |
| 6,944,349 | B1 | 9/2005 | Onno et al. |
| 6,950,535 | B2 | 9/2005 | Sibayama et al. |
| 6,989,773 | B2 | 1/2006 | Wee et al. |
| 7,113,645 | B2 | 9/2006 | Sano et al. |
| 7,349,579 | B2 | 3/2008 | Kadowaki et al. |
| 7,526,134 | B2 | 4/2009 | Matsubara |
| 7,778,473 | B2 | 8/2010 | Kodama |
| 7,830,967 | B1 | 11/2010 | Jannard et al. |
| 8,014,597 | B1 | 9/2011 | Newman |
| 8,611,652 | B2 | 12/2013 | Jannard et al. |
| 9,479,749 | B2 | 10/2016 | Jannard et al. |
| 2003/0018750 | A1 | 1/2003 | Onno et al. |
| 2004/0131274 | A1 | 7/2004 | Keren et al. |
| 2004/0168203 | A1 | 8/2004 | Seo et al. |
| 2004/0213472 | A1 | 10/2004 | Kodama et al. |
| 2005/0183118 | A1 | 8/2005 | Wee et al. |
| 2006/0146703 | A1 | 7/2006 | Cha et al. |
| 2006/0245738 | A1 | 11/2006 | Lee |
| 2007/0051817 | A1 | 3/2007 | Yano |
| 2007/0206852 | A1 | 9/2007 | McGee |
| 2008/0063070 | A1 | 3/2008 | Schwartz |
| 2008/0131013 | A1 | 6/2008 | Suino et al. |
| 2008/0273809 | A1 | 11/2008 | Demos |
| 2008/0291319 | A1 | 11/2008 | Jannard et al. |
| 2009/0141140 | A1 | 6/2009 | Robinson |
| 2010/0013963 | A1 | 1/2010 | Jannard et al. |

FOREIGN PATENT DOCUMENTS

| | | |
|---|---|---|
| JP | 2003-179759 A | 6/2003 |
| JP | 2004-165760 A | 6/2004 |
| JP | 2004-166224 A | 6/2004 |
| TW | 583883 B | 4/2004 |
| TW | 594627 B | 6/2004 |
| WO | WO 99/60793 A1 | 11/1999 |
| WO | WO 02/31756 A1 | 4/2002 |
| WO | WO 2008/128112 A1 | 10/2008 |
| WO | WO 2009/087783 A1 | 7/2009 |

OTHER PUBLICATIONS

Summons to Attend Oral Proceedings for European Application No. 10842625.5 dated Apr. 14, 2016 in 9 pages.

English translation of Japanese Office Action, issued in Japanese Patent Application No. 2012-544852, dated Jun. 6, 2014, in 6 pages.

English translation of Official Letter dated Feb. 27, 2014 in Taiwan Patent Application No. 099144282, and search report dated Feb. 24, 2014, in 3 pages.

Extended European Search Report issued in application No. EP10842625, dated Feb. 13, 2014, in 9 pages.

International Search Report and Written Opinion in related Application No. PCT/US2010/060851, dated Aug. 24, 2011 in 8 pages.

Doutre et al., An Efficient Compression Scheme for Colour Filter Array Images Using Estimated Colour Difference, IEEE Canadian Conference on Electrical and Computer Engineering, 2007, pp. 24-27.

Zhang et al., "Real-time lossless compression of mosaic video sequence", Real-Time Imaging 11, Aug. 10, 2005, pp. 370-377.

Compressed Y Image Data

| 1 | 2 | 3 | 4 | 5 | 6 | 7 | 8 | 9 |

Compressed U Image Data

| 1 | 2 | 3 | 4 | 5 | 6 | 7 | 8 | 9 |

Compressed V Image Data

| 1 | 2 | 3 | 4 | 5 | 6 | 7 | 8 | 9 |

*FIG. 7A*

Compressed Green Image Data

| 1 | 2 | 3 | 4 | 5 | 6 | 7 | 8 | 9 |
|---|---|---|---|---|---|---|---|---|

Compressed Red-Green Difference Image Data

| 1 | 2 | 3 | 4 | 5 | 6 | 7 | 8 | 9 |
|---|---|---|---|---|---|---|---|---|

Compressed Blue-Green Image Data

| 1 | 2 | 3 | 4 | 5 | 6 | 7 | 8 | 9 |
|---|---|---|---|---|---|---|---|---|

FIG. 7C

Compressed Green Image Data

| 1 | 2 | 3 | 4 | 5 | 6 | 7 | 8 | 9 |
|---|---|---|---|---|---|---|---|---|

Compressed Red-Green Difference Image Data

| 1 | 2 | 3 | 4 | 5 | 6 | 7 | 8 | 9 |
|---|---|---|---|---|---|---|---|---|

Compressed Blue-Green Image Data

| 1 | 2 | 3 | 4 | 5 | 6 | 7 | 8 | 9 |
|---|---|---|---|---|---|---|---|---|

FIG. 7D

|   |   |   |   |   | 26 |
|---|---|---|---|---|---|
|   | P | P | P | P |   |
|   | P | P | P | P |   |
|   | P | P | P | P |   |
|   | P | P | P | P |   |
|   |   |   |   |   |   |

RESOLUTION BASED FORMATTING OF COMPRESSED IMAGE DATA

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

BACKGROUND

The disclosure herein relates to devices for compression, decompression or reconstruction of image data for still or moving pictures, such as image data detected with a digital camera.

Digital cameras may detect optical images using sensors with color filter arrays, so that each picture element (or pixel) of the sensor corresponds to a color. For example, a sensor with a Bayer pattern color filter array will have some sensor elements that detect light in the green wavelengths, some sensor elements that detect light in the blue wavelengths, and some sensor elements that detect light in the red wavelengths. A full-color image is reconstructed using measurements taken from the sensor elements.

Different algorithms may be used to reconstruct the full-color image. Some algorithms are fast, but do not provide optimal quality in the reconstructed image. Other algorithms provide better image quality but may be slow. Digital cameras, such as those for capturing still and moving pictures, generate large amounts of data, and reconstructing a full-resolution image causes an increase in the amount of data that needs to be accessed.

SUMMARY

A compression algorithm operating on a digital camera may compress image components on a color-by-color basis. The compressed measurements can then be decompressed off-camera, and a user can choose the appropriate algorithm for reconstructing a full-color image. The resolution of a reconstructed image from a compressed image may be limited. For example, the bandwidth of a data interface may limit the rate that data can be sent over the data interface. The resolution of a display medium may be less than the resolution of a compressed image. A display medium may not have processing power sufficient to display full-resolution images at a desired rate. Some data contained in the image might be imperceptible to a viewer, and a user may determine that lower resolutions are acceptable. For these and other reasons, a compression algorithm may provide for display at various resolutions.

BRIEF DESCRIPTION OF THE DRAWINGS

FIGS. 7A-7D illustrate exemplary allocations of space for fixed-rate and variable-rate compression algorithm.

FIG. 8 illustrates a repetitive pattern in a color filter array.

DETAILED DESCRIPTION

Figure 1:
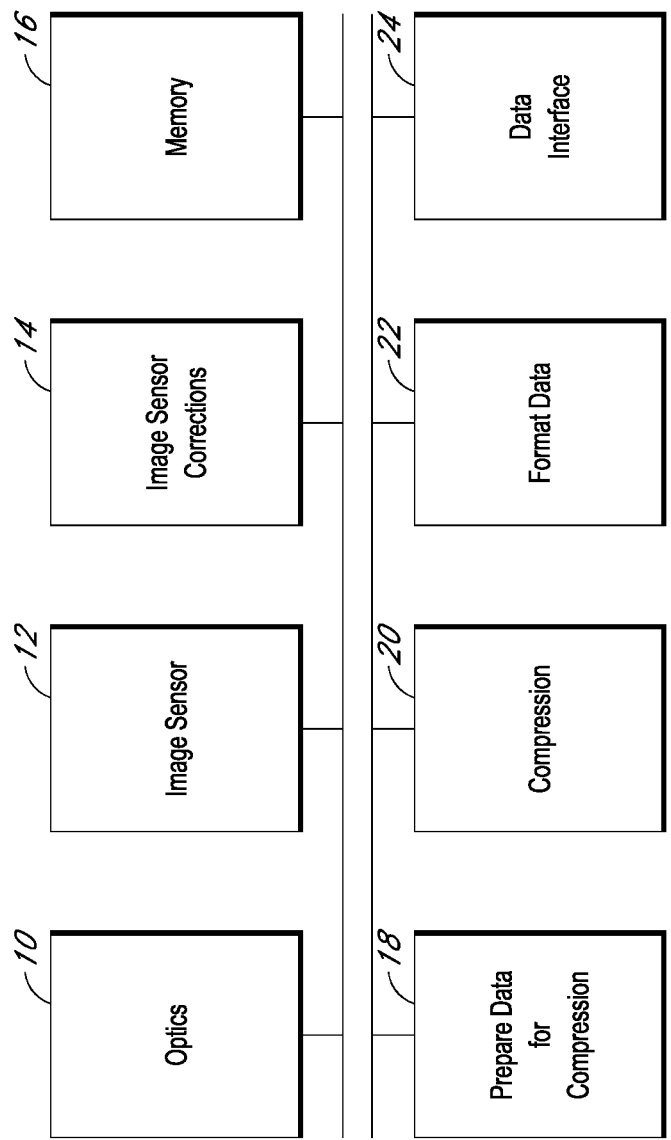
FIG. 1 is an exemplary block diagram illustrating a system that can include hardware and/or can be configured to perform methods for processing image data.

FIG. 1 is a block diagram of components in an exemplary device that detects optical data and compresses the detected data. An optics module 10 focuses an image on the image sensor 12. Sensors may include, for example, an array of charge-coupled devices (CCD) or Complementary Metal-Oxide-Semiconductor (CMOS) sensors such as active-pixel sensors. Such image sensor are typically built on silicon chips and may contain millions of image sensor cells. Each sensor cell detects light reaching its surface and outputs a signal that corresponds to the intensity of the light detected. The detected light is then digitized.

Because these image sensors are sensitive to a broad spectrum of wavelengths of light, a color filter array can be disposed over the light sensitive surface of such sensors. One type of color filter array is a Bayer pattern color filter array, which selectively passes red, blue, or green wavelengths to sensor elements. The output of such a sensor, however, is a mosaic image. This mosaic image is formed by the overlapping matrices of red, green, and blue pixels. The mosaic image is usually then demosaiced, so that each picture element has a full set of color image data. The color image data may be expressed in the RGB color format or any other color format.

Some of the embodiments disclosed herein are described in the context of a video camera having a single sensor device with a Bayer pattern filter. However, the embodiments herein can also be applied to cameras having other types of image sensors (e.g., CMY Bayer as well as other non-Bayer patterns), other numbers of image sensors, operating on different image format types, and being configured for still and/or moving pictures. It is to be understood that the embodiments disclosed herein are exemplary but non-limiting embodiments, and the inventions disclosed herein are not limited to the disclosed exemplary embodiments.

Returning to FIG. 1, The optics hardware 10 can be in the form of a lens system having at least one lens configured to focus an incoming image onto the image sensor 12. The optics hardware 10, optionally, can be in the form of a multi-lens system providing variable zoom, aperture, and focus. Additionally, the optics hardware 10 can be in the form of a lens socket supported by a camera housing and configured to receive a plurality of different types of lens systems for example, but without limitation, the optics hardware 10 include a socket configured to receive various sizes of lens systems including a 50-100 millimeter (F2.8) zoom lens, an 18-50 millimeter (F2.8) zoom lens, a 300 millimeter (F2.8) lens, 15 millimeter (F2.8) lens, 25 millimeter (F1.9) lens, 35 millimeter (F1.9) lens, 50 millimeter (F1.9) lens, 85 millimeter (F1.9) lens, and/or any other lens. As noted above, the optics hardware 10 can be configured such that despite which lens is attached thereto, images can be focused upon a light-sensitive surface of the image sensor 12.

The image sensor 12 can be any type of image sensing device, including, for example, but without limitation, CCD, CMOS, vertically-stacked CMOS devices such as the Foveon® sensor, or a multi-sensor array using a prism to divide light between the sensors. In some embodiments, the image sensor 12 can include a CMOS device having about 12 million photocells. However, other size sensors can also be used. In some configurations, camera 10 can be configured to output video at "4.5k" horizontal resolution (e.g., 4,520×2540), "4k" (e.g., 4,096×2,540 pixels), "2k" (e.g., 2048×1152 pixels) or other resolutions. As used herein, in the terms expressed in the format of xk (such as 2k and 4k noted above), the "x" quantity refers to the approximate horizontal resolution. As such, "4k" resolution corresponds to about 4000 or more horizontal pixels and "2k" corresponds to about 2000 or more pixels.

The camera can also be configured to downsample and subsequently process the output of the sensor 12 to yield video output at 2K, 1080p, 720p, or any other resolution. For example, the image data from the sensor 12 can be "windowed", thereby reducing the size of the output image and allowing for higher readout speeds. However, other size sensors can also be used. Additionally, the camera can be configured to upsample the output of the sensor 12 to yield video output at higher resolutions.

The output of the sensor 12 may be stored in memory 16. Some sensor elements may be defective, or the output of some sensor elements may be inaccurate. For example, a sensor value for a sensor element may remain constant regardless of the amount of light reaching the sensor element, or a sensor value may not accurately reflect the amount of light reaching the sensor element. There may also be defects in the color filter array. In these cases, image sensor correction module 14 may replace the data from the defective sensor element with data from other sensor elements. For example, if a sensor element corresponding to a green filter is defective, the output of the defective sensor element could be replaced with some average value of green sensor elements in the vicinity of the defective element. There may also be variation in gains in rows of data obtained from the sensor. The image sensor correction module 14 may adjust the detected values to compensate for these variations. The image sensor correction module 14 may, for example, operate on data that is stored in memory 16, or it may operate on data as it comes from the image sensor 12.

With continued reference to FIG. 1, the image data is prepared for compression in compression preparation module 18. In some embodiments, the compression preparation module 18 can be configured to separate the sensor data by color. For example, with a Bayer color filter array, the image data may be separated into red image data, blue image data, and green image data.

In some color filter array patterns, the number of sensor elements associated with each color may vary. For example, the Bayer color filter array has twice as many green elements as red elements and blue elements. In addition to separations by color, the image data for a color may be divided into smaller groups. In some embodiments using a Bayer color filter array, the image data may be separated into red image data, blue image data, first green image data and second green image data in preparation for compression. In some embodiments, the color image data may be transformed to another color space prior to compression. For example, color image data in an RGB color space may be transformed into one of many different color spaces, such as a YUV color space, a YCbCr color space, or a custom color space.

Some compression algorithms or chips are optimized for gamma encoded data. Accordingly, a gamma function or power log curve may be applied prior to compression. To avoid performing complicated calculations for each picture element, the gamma function could be encoded in a look-up table. In some embodiments, the optional look-up table is used for one or more of the channels to be compressed, such as the green data channels or the Y data channels. In other embodiments, look-up tables are used for all of the channels to be compressed. The same look-up table may be used for different channels, or each channel may have its own look-up table.

In some embodiments, a pre-emphasis curve uses a relationship similar to $y=x^a+b$, where a could be, for example, 0.5, and where b could be, for example, 0. In some embodiments, the pre-emphasis curve can be used where the image data was, for example but without limitation, floating point data in the normalized 0-1 range. In other embodiments, for example, where the image data is 12-bit data, the image can be processed using a relation of $$y = \sqrt{\frac{x}{4095}},$$

so that the 12-bit data is normalized to be within a range between 0 and 1. Additionally, the image data can be processed with other curves, such as $y=ax^b+c$ where $0.0<b<1$ and c is an offset, which can be 0 in some embodiments. Additionally, log curves can also be used. For example, curves in the form $y=A*\log(B*x+C)$ where A, B, and C are constants chosen to provide the desired results. Additionally, the above curves and processes can be modified to provide more linear areas in the vicinity of black, similar to those techniques utilized in the Rec709 gamma curve. In applying these processes to the image data, the same processes can be applied to all of the image data, or different processes can be applied to the different colors of image data. However, these are merely exemplary curves that can be used to process the image data, or curves or transforms can also be used. Additionally, these processing techniques can be applied using mathematical functions such as those noted above, or with Look Up Tables (LUTs). Curves stored in a Look Up Table may vary from the curves described above. Further, a curve may use different equations for ranges of input data. For example, a lower range of a curve may be represented by $y=ax^b+c$ while an upper range of the curve may be represented by $y=dx+e$. Additionally, different processes, techniques, or transforms can be used for different types of image data, different ISO settings used during recording of the image data, temperature (which can affect noise levels), etc.

Once the data is ready for compression, the compression preparation module 18 may, for example, store the prepared data in memory 16, or may provide the data to compression module 20.

The compression preparation module 18 may split the image data into tiles that can be compressed separately. Tiles can have any size, and the whole image can be considered as one tile. Splitting the image into tiles is not necessary for compression.

The compression module 20 then compresses the data from the compression preparation module 18. In some embodiments, the compression module 20 uses processors to perform the compression, such as general purpose processors, DSPs, or processors specialized for image processing. In other embodiments, the compression module 20 uses compression chips to perform the compression. For example, the compression module 20 could use one or more custom chips such as, for example, ASIC or FPGA custom chips, or one of many commercially available compression chips or chipsets. The compression module 20 may include subcomponents to allow parallel compression of image data. For example, the compression module 20 may use a first processor or compression chip to compress picture elements corresponding to a first wavelength in a color filter array (for example, red, green, or blue), and a second processor or compression chip to compress picture elements corresponding to a second wavelength in the color filter array.

In some embodiments, the compression module 20 comprises one or more JPEG 2000 compression chips. In some embodiments, the compression module 20 comprises one or more ADV202 or ADV212 JPEG 2000 Video Codec chips available from Analog Devices. In some embodiments, the compression module 20 comprises one or more QuVIS Digital Mastering Codecs available from QuVIS, Inc. In some embodiments, the compression module 20 comprises one or more RB5C635 JPEG 2000 Coders available from Ricoh.

After compression, a data formatting module 22 prepares the compressed data for transmission over a data interface 24. The data formatting module 22 may prepare the data to be compliant with a standard format, such as JPEG 2000, or it may prepare the data using a non-standard format. The data formatting module 22 may select portions of the compressed data for inclusion in the data for the final image. For example, the data formatting module 22 may use only a portion of the compressed data so that the resulting size of the image is less than the captured size.

The formatted data is then transmitted over data interface 24. Data interface 24 may, for example, transmit the data to a hard drive, compact flash card, or solid state drive. The data may also be transmitted over one or more data communication links. Exemplary communication protocols may include Ethernet, USB, USB2, USB3, IEEE 1394 (including but not limited to FireWire 400, FireWire 800, FireWire S3200, FireWire S800T, i.LINK, DV), SATA and SCSI. Multiple storage devices or communications links may be used in parallel to increase the recording rate through data interface 24.

Figure 2:
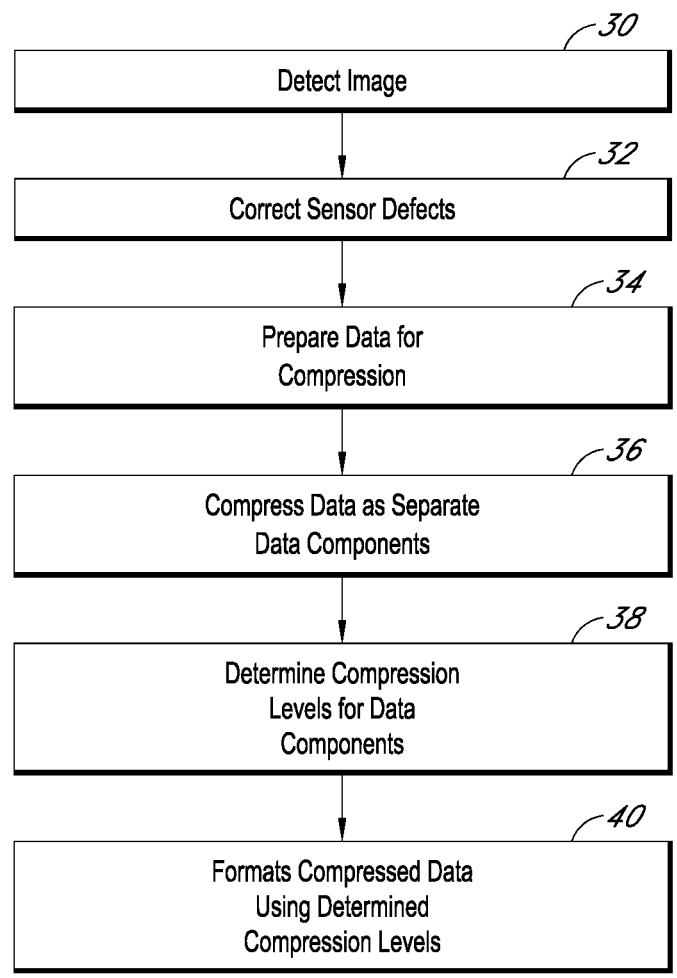
FIG. 2 is an exemplary flow diagram illustrating preparation and formatting of a compressed image.

FIG. 2 is a flow diagram illustrating an exemplary embodiment for compressing image data. At step 30, image sensor 12 detects the image data. At step 32, the detected image sensor data is optionally corrected for defects or inaccuracies in the sensors measurements. Exemplary corrections may include replacing data from dead sensor elements with data from surrounding elements, or adjusting for variation in gains in rows of data obtained from the sensor.

At step 34, the image data is prepared for compression. In some embodiments, the sensor data is grouped by color. For example, with a Bayer color filter array, the image data may be separated into one or more red image data groups, one or more blue image data groups, and one or more green image data groups. In some embodiments, the color image data may be transformed to another color space prior to compression. For example, color image data in an RGB color space may be transformed into one of many different color spaces, such as a YUV color space, a YCbCr color space, or a custom color space. An exemplary custom color space may use a first channel for a difference between red and green data and a second channel for a difference between blue and green data. In some embodiments, demosaicing may be part of the color space transformation process. The image data may be split into tiles that can be compressed separately. Tiles can have any size, and the whole image can be considered as one tile. Splitting the image into tiles is not necessary for compression.

At step 36, the image data is compressed. Multiple compression components may be used to compress the data in parallel, or a single compression component may be used to compress the data serially. The image data may be separated into channels for compression. For example, if the data to be compressed is in the RGB color space, the channels may comprise one or more red image data channels, one or more blue image data channels, and one or more green image data channels. If the data to be compressed is in the YUV color space, the channels may comprise one or more Y image data channels, one or more U image data channels, and one or more V image data channels. In some embodiments, the color space may include one or more green image data channels, one or more channels derived from a difference between red image data and green image data, and one or more channels derived from a difference between blue image data and green image data. In some embodiments, a first compression component compresses a first green image data channel, a second compression component compresses a second green image data channel, a third compression component compress a channel derived from a difference between red image data and green image data, and a fourth compression component compresses a channel derived from a difference between blue image data and green image data.

In some embodiments, data in the channels are compressed using a scalable compression algorithm. Types of scalable compression algorithms include, for example, layer progressive, resolution progressive, and component progressive algorithms.

In some embodiments, data in the channels are compressed using a scalable compression algorithm such as JPEG 2000. An exemplary JPEG 2000 implementation may use wavelet transforms such as the (9/7) floating point wavelet transform or the (5/3) integer wavelet transform. The compression algorithm may allow customization of compression parameters, such as a quantization factor, code block size, number of transform levels, reversible or irreversible compression, a desired compression ratio with a variable bit rate output, a desired fixed bit rate output with a variable compression rate, progression order, output format, or visual weighting.

The output of the scalable compression algorithm may also be modified to obtain a desired compression ratio or bit rate output. For example, with a scalable compression algorithm that has a plurality of transform levels, some of the transform levels output from the algorithm could be dropped. In some embodiments, the transform levels are dropped so that a desired compression ratio is achieved. In other embodiments, the transform levels are dropped so that a desired fixed bit rate output is not exceeded.

In some embodiments, the compression algorithm operates on different channels of data in parallel. For example, if the data to be compressed is in the YUV color space, the channels may comprise one or more Y image data channels, one or more U image data channels, and one or more V image data channels. A first compression component may compress the U channel, a second compression component may compress the V channel, and third and fourth compression components may compress the Y channel. In another example, the color space may include one or more green image data channels, one or more channels derived from a difference between red image data and green image data, and one or more channels derived from a difference between blue image data and green image data. First and second compression components may compress green image data channel(s), a third compression component may compress a channel derived from a difference between red image data and green image data, and a fourth compression component may compress a channel derived from a difference between blue image data and green image data.

The compression of the various channels can be controlled by setting different parameters for each channel. Even though the individual compression components in these examples may have parameters to control compression levels for the individual channels, additional benefits may be gained by examining the compressed output to determine further allocation of bits. In some embodiments, the various compression components may not be in communication with each other to coordinate compression levels, or the overall system architecture may not readily facilitate coordination of the compression components.

At step 38, the compressed output from step 46 may be examined to determine whether the compressed data should be modified further. In some embodiments, transform levels from one or more channels may be dropped so that an overall compression ratio is achieved. In other embodiments, transform levels from one or more channels may be dropped so that an overall bit rate output for all channels is not exceeded.

At step 40, the compressed data is formatted. In some embodiments, the data may already be in the desired format, so no additional manipulation is necessary. In some embodiments, the data is formatted to conform with a standard protocol such as JPEG 2000. In some embodiments, the data is encrypted.

Figure 3:
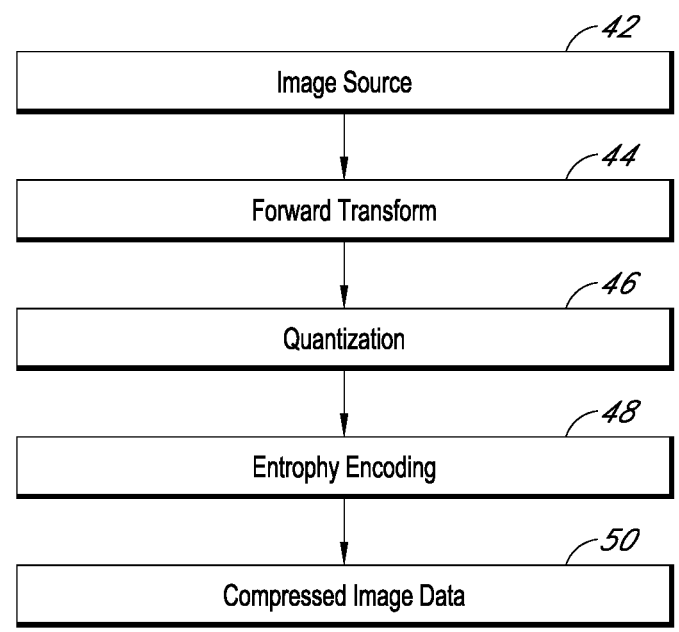
FIG. 3 is an exemplary flow diagram illustrating compression of an image.

FIG. 3 illustrates a process for compressing image data using the entropy of the image. At step 42, source image data is prepared for compression. In some embodiments, the compression for each channel is performed separately. In some embodiments, a channel may have one or more tiles that are processed separately.

In some embodiments, a transform is applied to the source image data at step 44. For example, DCT or wavelet transforms may be used to transform image data (such as RGB, YUV, YCrCb, or other formats of image data) in preparation for compression. In some embodiments, a dyadic wavelet transform is applied to each of the Y channel data, U channel data, and V channel data. In other embodiments, a dyadic wavelet transform is applied to each of the G channel data, R and G channel difference data, and B and G channel difference data.

The transformed data is then quantized at step 46. In some embodiments, quantization may be skipped, or the quantization step size may be set to 1.0, resulting in no quantization. Different channels may have different quantization step sizes. Further, different transform levels may have different quantization step sizes. In some embodiments, the quantization step sizes may achieve a given level of "quality." In some embodiments, the quantization step sizes may achieve a fixed rate, perhaps through an iterative process.

The quantized data is then entropy encoded at step 48, resulting in the compressed image data at step 50.

Figure 4:
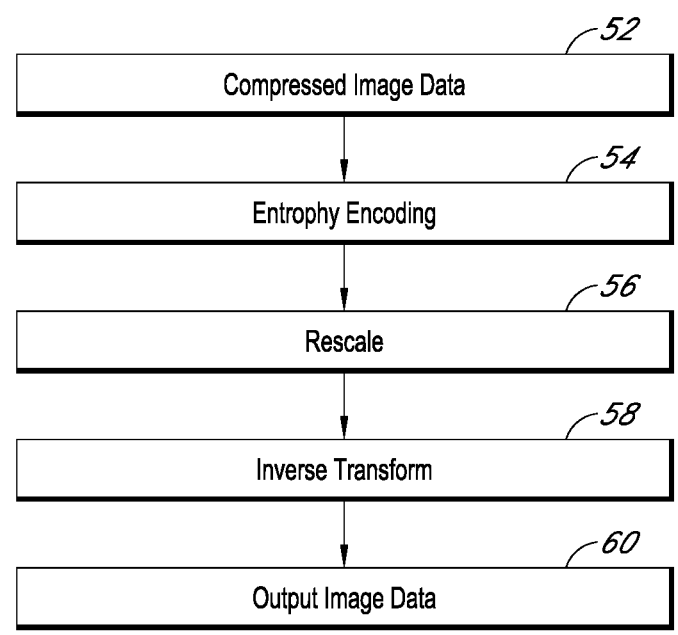
FIG. 4 is an exemplary flow diagram illustrating decompression of an image.

FIG. 4 illustrates a similar process for decompressing image data that was compressed using the entropy of the image. At step 52, the compressed image data is provided to an entropy decoder at step 54. The decoded image data is rescaled in accordance with the quantization that was applied at step 46. An inverse transform is applied at step 58 to the rescaled image data, resulting in output image data at step 60 that corresponds to the image source data at step 42 from FIG. 3. If the compression is lossless, the output image data will be the same as the input image data. If the compression is lossy, the output image data may be different from the input image data. In some lossy compression embodiments, the differences between the reconstructed output image and the original input image may be visually unnoticeable.

Figure 5A:
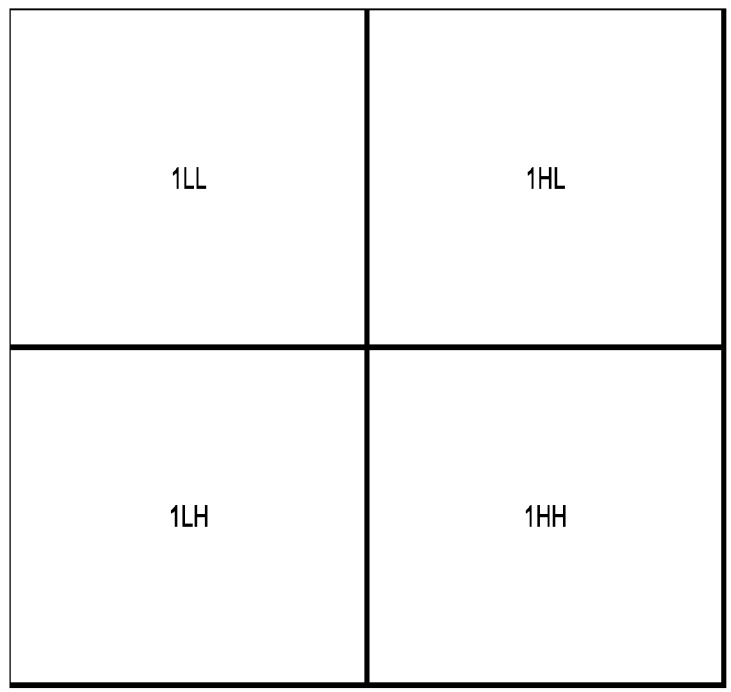
FIGS. 5A-5C illustrate exemplary sub-bands corresponding to a wavelet transform.
Figure 5B:
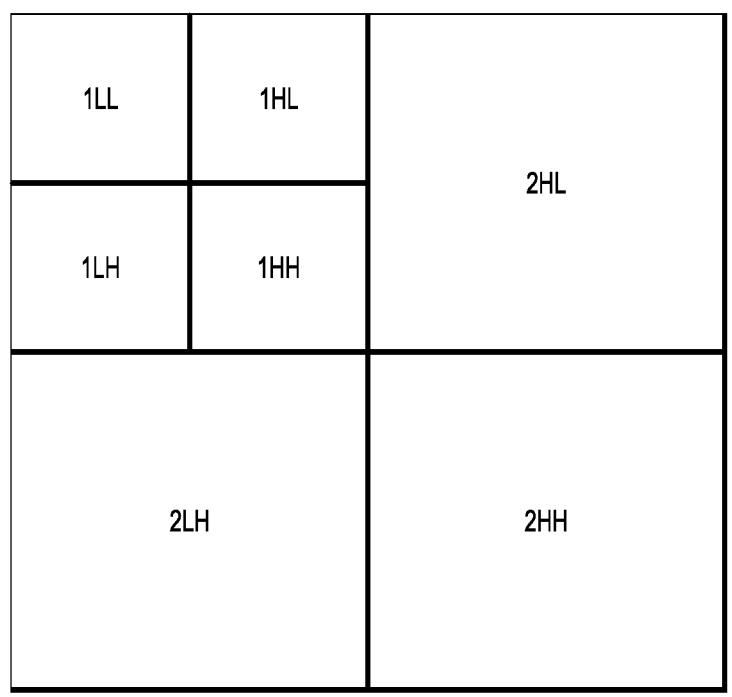
Figure 5C:
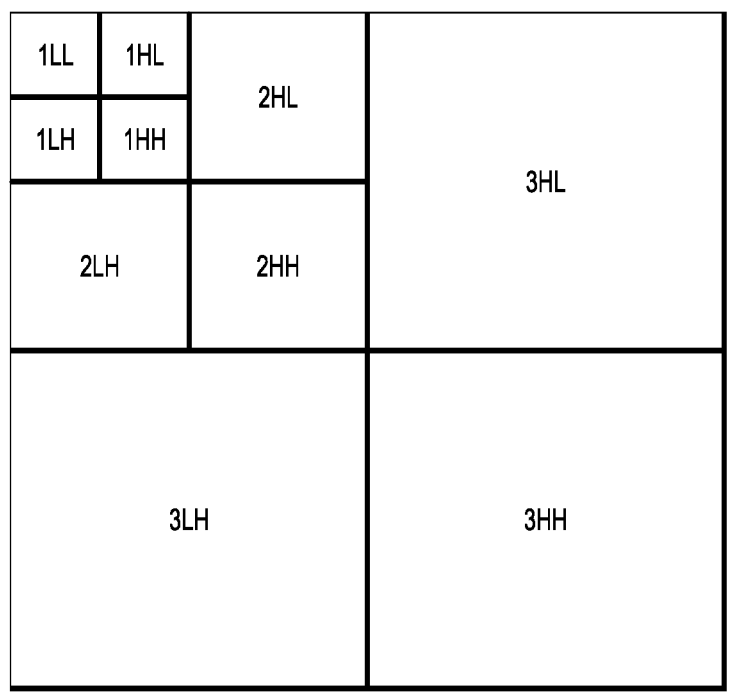

FIGS. 5A-5C illustrate an example of applying a two-dimensional wavelet transform to decompose a tile into a series of levels which each contain a number of sub-bands. These subbands describe the high and low frequency components of the horizontal and vertical characteristics of the level. For example, FIG. 5A illustrates a quadrant 1LL that is composed of the low frequencies in the horizontal and vertical directions, a quadrant 1HL that is composed of the low frequencies in the horizontal direction and high frequencies in the vertical direction, a quadrant 1LH that is composed of the high frequencies in the horizontal direction and low frequencies in the vertical direction, and a quadrant 1HH that is composed of high frequencies in the horizontal and vertical directions. Each of the quadrants 1LL, 1HL, 1LH, and 1HH illustrated in FIG. 5A have a resolution that is one-half of the original resolution in each direction. Thus, each quadrant has one-fourth the pixels of the original image.

FIG. 5B illustrates a further application of the wavelet transform to quadrant 1LL from FIG. 5A, resulting in new quadrants 1LL, 1HL, 1LH, and 1HH, with each of the new quadrants having one-half of the resolution in each direction of quadrant 1LL from FIG. 5A. Quadrant 2HL in FIG. 5B corresponds to quadrant 1HL in FIG. 5A, quadrant 2LH in FIG. 5B corresponds to quadrant 1LH in FIG. 5A, and quadrant 2HH in FIG. 5B corresponds to quadrant 1HH in FIG. 5A.

FIG. 5C illustrates the process of further applying transforms to quadrant 1LL from FIG. 5B. The process of applying transforms to the low-frequency quadrant 1LL can be continued, with each transformation resulting in progressively smaller resolution levels. In some embodiments, the process may be repeated to provide, for example, up to five resolution levels. In other embodiments, the process may be repeated to provide ten, twelve, or more resolution levels. The maximum number of possible resolution levels is only limited by the size of the original image, although less benefit may be gained when the resolution levels become too numerous.

The transformed data can be stored in various ways. For example, the transformed data could be stored by channel (e.g., red, blue, green 1 or green 2), by resolution (e.g., 1LL, 2LL, 3LL, etc.), by frames, or a combination of these approaches.

Images captured at a high resolution may sometimes be viewed at a lower resolution. For example, data from a video camera may be sent over a network connection to a viewing device having a lower resolution than the resolution of the captured data. There is no need to transmit the high-resolution information that will not be used by the lower-resolution viewing device, and transmitting just the lower-resolution information may help to avoid bandwidth issues on the network. In some embodiments, image data is stored in a format that allows access to data at individual resolution levels, so that higher resolution information does not need to be processed in order to view lower resolution information.

Some color filter arrays contain duplicate color elements. For example, a Bayer pattern typically contains two green elements for each red or blue element. Even though two green channels are captured, a single green channel could be used to reconstruct the images. Image data may be stored in a format that allows access to red, blue and the first green channel without requiring access to the second green channel. Thus, for some lower-bandwidth applications, only three of the four color channels may be used for reconstruction, and the fourth channel would not need to be transmitted.

An array of offsets may be used to locate starting positions for various resolutions and/or channels. In some embodiments, the offsets may identify locations directly. For example, offsets may point to specific locations as measured from the beginning of a file. In other embodiments, the offsets may be cumulative of previous offsets. For example, each frame of image data may have an associated offset. In some embodiments, a frame of video data may comprise a plurality of tiles, where the tiles piece together to form the frame. Each tile may be associated with an offset. With the frames and/or tiles of video data, there may be additional offsets that are measured from the beginning of the frame or tile of video data and point to, for example, components relating to that frame of video data.

In some embodiments, the offsets may be bit-shifted so that the offsets indicate blocks of data. The file format may allow configuration of the number of bits to be shifted, which in turn may correspond to a maximum file size. As an example, if the offset is bit-shifted 12 bits to provide a 4-Kbyte alignment, a 32-bit offset allows a maximum offset indicator of 16 Terabytes ($2^{32+12}$=17,592,186,044,416=16 Terabytes). Similarly, an offset bit-shifted 14 bits provides a 16-Kbyte alignment, and a 32-bit offset allows a maximum offset indicator of 64 Terabytes.

Offsets can be provided for specific resolutions and/or color channels, or offsets can be provided for groupings of resolutions and/or color channels. Example 1 below illustrates offsets for each resolution level, with the green 1, blue and red channels grouped together and the green 2 channel grouped separately. The example assumes that there are M+1 resolution levels and N tiles. The first offset points to the first tile and the lowest resolution level for the green 1, blue and red channels. The second offset points to the next lowest resolution level, and the process continues up to the highest resolution level M+1. Similar offsets for the second tile follow the offsets for the first tile. The process continues for all N tiles. After the green 1, blue and red channels are processed for the M+1 resolution levels and the N tiles, the green 2 channel is processed for the M+1 resolution levels and the N tiles.

EXAMPLE 1

| Offset # | | Description |
|---|---|---|
| 1 | tile 1 | green1 1LL, blue 1LL, red 1LL |
| 2 | tile 1 | green1 1HL, blue 1HL, red 1HL, green1 1LH, blue 1LH, red 1LH, green1 1HH, blue 1HH, red 1HH |
| 3 | tile 1 | green1 2HL, blue 2HL, red 2HL, green1 2LH, blue 2LH, red 2LH, green1 2HH, blue 2HH, red 2HH |
| . | . | . |
| M + 1 | tile 1 | green1 MHL, blue MHL, red MHL, green1 MLH, blue MLH red MLH, green1 MHH, blue MHH, red MHH |
| M + 2 | tile 2 | green1 1LL, blue 1LL, red 1LL |
| | tile 2 | green1 1HL, blue 1HL, red 1HL, green1 1LH, blue 1LH, red 1LH, green1 1HH, blue 1HH, red 1HH |
| . | . | . |
| 2(M × N) + N | tile 2 | green1 MHL, blue MHL, red MHL, green1 MLH, blue MLH, red MLH, green1 MHH, blue MHH, red MHH |

-continued

| Offset # | | Description |
|---|---|---|
| 2(M × N) + N + 1 | tile 1 | green2 1LL |
| 2(M × N) + N + 2 | tile 1 | green2 1HL, green2 1LH, green2 1HH |
| . | . | . |
| 4(M × N) + 2N | tile 2 | green2 MHL, green2 MLH, green2 MHH |

Example 1 groups information (e.g., green 1 1LL, blue 1LL, red 1LL) to share the same offset. Each of the pieces of information could have its own offset. This would increase the total number of offsets, but it would also increase the flexibility in accessing certain pieces of information.

Example 1 orders the information so that the green 1, blue, and red channels are ordered first for each of the tiles, followed by the green 2 channel for each of the tiles. Assuming that just the green 1, blue, and red channels are needed for processing, this ordering of needed data to be contiguous reduces the number of times a storage device will need to seek to a new location. In addition, there may be space between where the data ends for one offset and the beginning of the next offset. Grouping data together to reduce the number of offsets used may also mean that less space is wasted between offsets.

Figure 6:
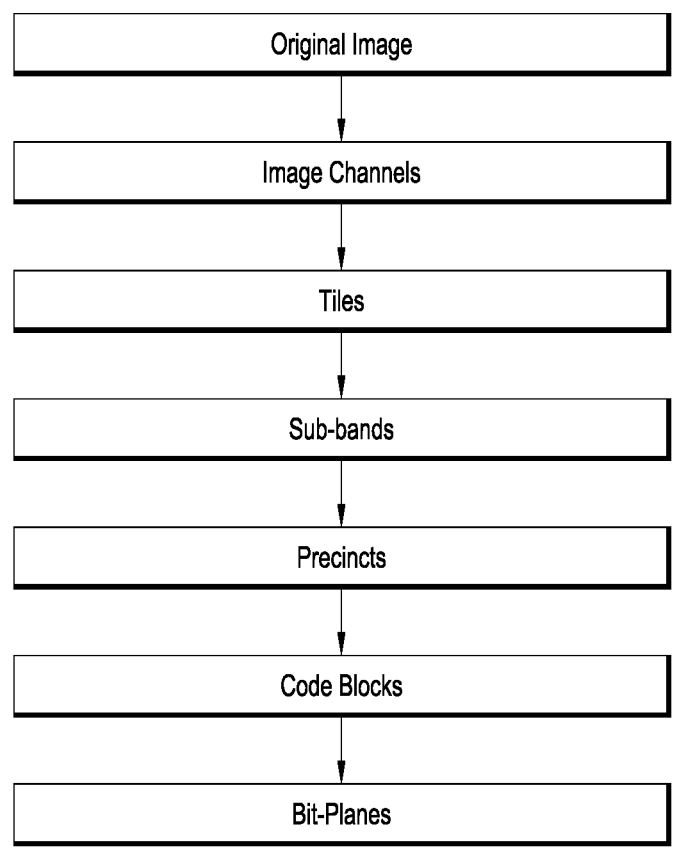
FIG. 6 illustrates exemplary data components that may be used in compressing an image.

FIG. 6 illustrates an exemplary hierarchy for breaking down an image for compression. The elements shown in FIG. 6 are not all necessary, and it is to be understood that elements may be removed from the hierarchy in some embodiments. A detected image may be separated into one or more channels, such as Y, U, and V channels; red, green and blue channels; or green, red-green difference, and blue-green difference channels.

The channels may be divided into one or more tiles. The tiles may be transformed into one or more sub-bands. For example, a wavelet transform may transform a tile into sub-bands as illustrated in FIG. 5. The sub-bands may be divided into precincts or packet partition locations. In some embodiments, the precincts or packet partition locations in one sub-band have a spatial correlation with precincts or packet partition locations in other sub-bands, and the corresponding precincts or packet partition locations from the sub-bands are processed together. The precincts of packet partition locations may be divided into blocks.

Each block may have a plurality of transformed and/or quantized values. The values in a block may be entropy coded as a group.

The entropy coding may operate on a bit-level. For example, the most significant bits (MSB) for each value in the block may be entropy coded together. Similarly, the next MSB for each value may be entropy coded together. The entropy coding of bits may also take into consideration the evaluation of other bit-planes.

One or more data components, such as those illustrated in FIG. 6, may be combined or used to provide various quality increments or resolution levels for a spatial location. In some embodiments, data components are grouped into packets that provide one quality increment for one resolution level at a spatial location. A collection of packets that provide one quality increment at full resolution are combined into a layer. The layer, for example, may correspond to a quality increment of a channel of an image at full resolution. Additional layers provide additional quality increments.

FIG. 7A illustrates an allocation of space for nine layers in the Y, U and V channels. As illustrated, each layer is allocated a fixed amount of space. This illustration corresponds to a rate-limited application of a compression algorithm.

Figure 7B:
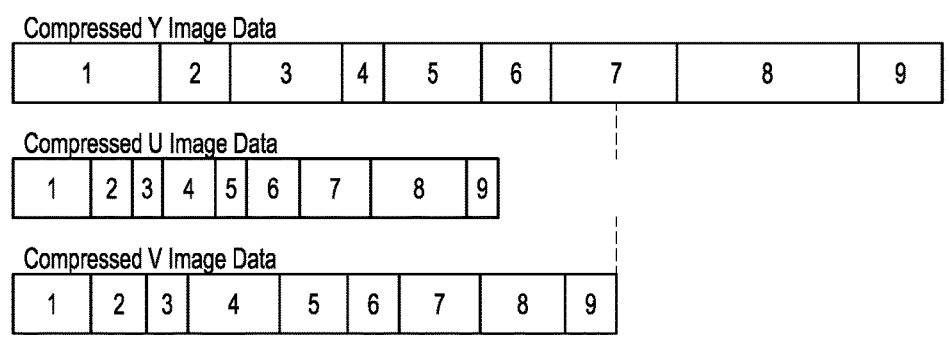

FIG. 7B also illustrates an allocation of space for nine layers in the Y, U and V channels. In this figure, the space used by a layer is variable. The space used by a channel that compresses well is less than the space used by a channel that does not compress as well. In this example, the space used by the Y channel is greater than the space used by the U and V channels. Each layer within a channel may also use a variable amount of space. For example, layers 1 and 8 of the Y channel use more space than layers 4 and 6.

As illustrated, the space used by the combination of layers in FIG. 7B is greater than the space used by the combination of layers in FIG. 7A. Some applications that use variable bit-rate encoding for the layers may have an overall bit-rate that is not to be exceeded. Each channel could be allocated a fixed amount of space, and layers that exceed the space limitations could be discarded. For example, in FIG. 7B layers 7, 8 and 9 of the Y channel could be discarded so that the overall limitations for the Y channel are not exceeded. Alternatively, all the channels together could be allocated a fixed amount of space, and layers from one or more channels could be discarded as needed to meet the space limitations. For example, layer 9 of the Y channel and layers 8 and 9 of the U and V channels could be discarded so that the overall space limitations for all of the channels are met.

In some embodiments, the resulting quality levels of each channel are substantially similar. For example, discarding layer 9 of the Y channel and layers 8 and 9 of the U and V channels means that the channels are within one quality level of each other. In some embodiments, layers are discarded in a way that ensures some channels have as good as or higher quality levels than other channels. For example, the Y channel may be more important for obtaining a reconstructed image that is visually lossless. As an example, none of the layers for the Y channel might be discarded, but layers 7, 8 and 9 in the U and V channels are discarded to comply with the overall space limitations.

As another example, the difference in quality increments between channels may be more than one, but less than a set amount. For example, if the allowed difference in quality increments is 3, one channel might layers 1 through 8 while other channels might only use layers 1 through 5.

FIGS. 7C and 7D are similar to FIGS. 7A and 7B, respectively, and show that the algorithms discussed above can apply to other color spaces. As shown in FIGS. 7C and 7D, the algorithms are applied to images having green channel data, red-green difference channel data, and blue-green difference channel data. Although FIGS. 7A-7D illustrate one channel for each color-space index, it is to be understood that multiple channels could be used. For example, the Y image data in FIGS. 7A-7B could be split into two or more channels. As another example, the green image data in FIGS. 7C-7D could be split into two or more channels.

Figure 8:
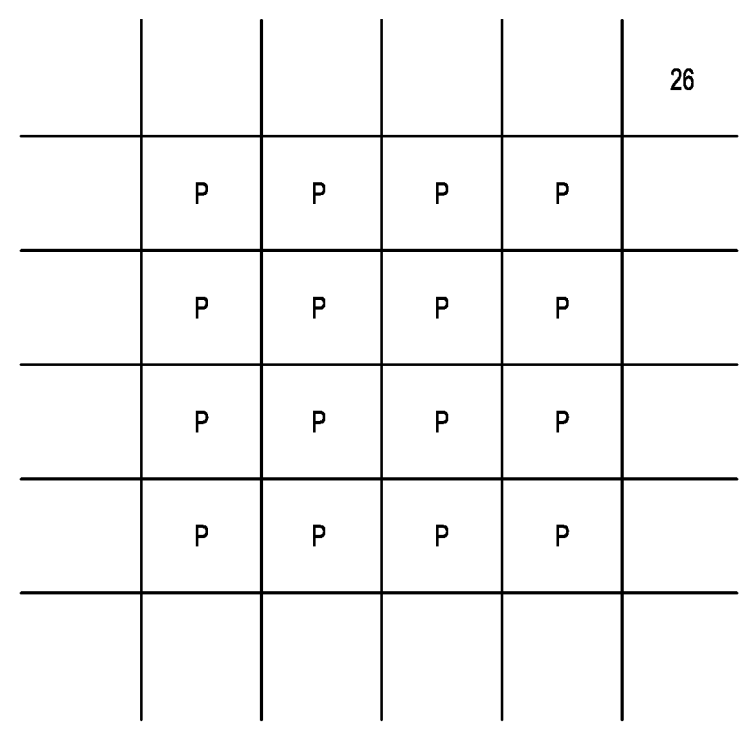

In some embodiments, the compression is performed on image data from a sensor that has not been fully reconstructed. For example, an image sensor may use a color filter array to detect selected wavelengths of light at a sensor element. The color filter array may comprise a repeating pattern 26, such as illustrated in FIG. 8.

In some embodiments, data from the sensor is compressed without converting some or all of the data to another color space. For example, a sensor using a Bayer pattern color filter array may convert the red and blue data to red-green difference and blue-green difference data for compression, while the green data is compressed without conversion to another color space. As another example, a sensor using the color filter array may use a green channel (or a white channel), a white-green difference channel, red-green difference and blue-green difference data for compression. In some embodiments, data from the sensor is compressed after conversion to another color space. For example, a sensor using a Bayer pattern color filter array may convert the red, green and blue data to Y, U and V data.

In some embodiments, a difference value is obtained by obtaining a difference between two adjacent values. For example, red-green or blue-green difference value may be obtained by determining the difference between a green value and an adjacent red value or blue value. In some embodiments, an average value is used to obtain the difference value. For example, but without limitation, average values of 2, 3, 4, or more green image data values can be calculated and subtracted from red or blue picture elements in the vicinity of the green picture elements.

U.S. patent application Ser. No. 12/422,507 filed Apr. 13, 2009, the entire contents of which is hereby incorporated by reference, discloses additional embodiments for processing of image data.

As noted above, some color filter arrays have twice as many green elements as red elements and blue elements. In other words, the red and blue elements each comprise 25% of the total color filter array, and the green elements comprise 50% of the total color filter array. Thus, in some embodiments, where all of the green image data is retained, additional green data image processing modules can be used. For example, a first green data image processing module can process half of the green elements and a second green image data processing module can process the remaining green elements. However, embodiments can be used in conjunction with other types of patterns, such as for example, but without limitation, CMY and RGBW.

As noted above, a compression module 20 can be configured to perform any type of compression process. In some embodiments, the compression module 20 performs a compression technique that benefits from the techniques performed by the compression preparation module 18. For example, as noted above, the compression preparation module 18 can be configured to determine green difference values for the red and blue data, thereby resulting in data that becomes more chroma-like. Thus, the compression technique performed by the compression module 20 can be of a type that benefits from the presence of chroma data to reduce the size of the compressed data output therefrom.

Further, the compression module 20 can be configured to compress the image data from the image processing module 20 to result in a visually lossless output. For example, firstly, the compression module can be configured to apply any known compression technique, such as, but without limitation, H.264, MPEG4, Huffman, JPEG, JPEG 2000, Motion-JPEG, DCT based codecs, wavelet based codecs, other codecs designed for compressing image data, or other techniques.

Depending on the type of compression technique used, the various parameters of the compression technique can be set to provide a visually lossless output. For example, many of the compression techniques noted above can be adjusted to different compression rates, wherein when decompressed, the resulting image is better quality for lower compression rates and lower quality for higher compression rates. Thus, the compression module can be configured to compress the image data in a way that provides a visually lossless output, or can be configured to allow a user to adjust various parameters to obtain a visually lossless output.

As used herein, the term "visually lossless" is intended to include a reconstruction of processed image data that, when compared side by side with a reconstruction of original image data on the same display device, one of ordinary skill in the art would not be able to determine which image reconstruction is the original with a reasonable degree of accuracy, based only on a visual inspection of the images.

The compressed data can be stored on a storage device. The storage device can be in the form of any type of digital storage, such as, for example, but without limitation, hard drives, solid-state drives, flash memory, optical discs, or any other type of memory device. In some embodiments, the size of the storage device can be sufficiently large to store image data from the compression module 20 corresponding to at least about 30 minutes of video at 12 mega pixel resolution, 12-bit color resolution, and at 60 frames per second. However, the storage device can have any size.

In some embodiments, the storage device can be mounted on an exterior of a camera housing. Further, in some embodiments, the storage device can be connected to the other components through standard or custom communication ports, including, for example, but without limitation, Ethernet, USB, USB2, USB3, IEEE 1394 (including but not limited to FireWire 400, FireWire 800, FireWire S3200, FireWire S800T, i.LINK, DV), SATA and SCSI. Further, in some embodiments, the storage device can comprise a plurality of hard drives, such as those operating under a RAID protocol. However, any type of storage device can be used.

In some embodiments, the algorithms disclosed herein can be implemented as routines stored in a memory device. Additionally, a processor can be configured to execute the control routine. In some embodiments, custom circuitry may be used.

The techniques can be applied to the processing of a single still image or multiple images. These processes can also be applied to the processing of continuous video, e.g., 10, 20, 24, 30, 60, and 120 frames per second, or any other frame rate.

By processing the image data in the manner described herein, it has been discovered that the image data from the image sensor 12 can be compressed by a compression ratio of 6 to 1 or greater and remain visually lossless. Additionally, although the image data has been transformed (e.g., by obtaining difference values), the raw image data is still available to an end user. For example, by reversing certain of the processes, all or substantially all of the original raw data can be extracted and thus further processed, filtered, and/or demosaiced using any process the user desires. For example, the data stored in the storage device can be decompressed and demosaiced.

Figure 9:
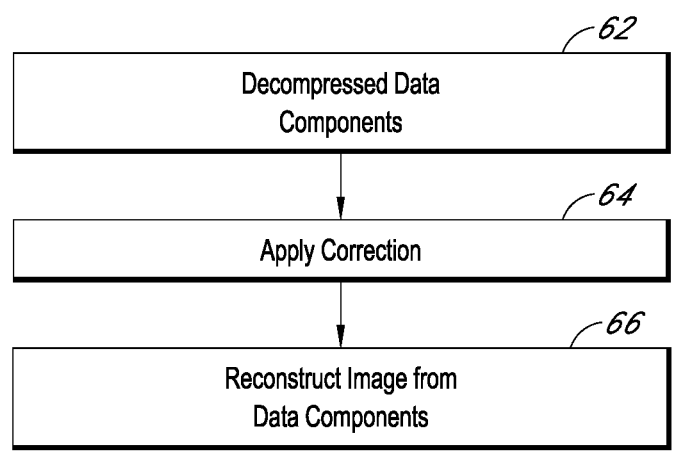
FIG. 9 is an exemplary flow diagram illustrating reconstruction of a compressed image.

FIG. 9 illustrates an exemplary flowchart for reconstruction a compressed image. At block 62, image data is decompressed. As explained above, the image data may have been compressed according to channels. In some embodiments, not all of the channels are decompressed for reconstruction of an image. For example, a compressed image may have two channels that correspond to green picture elements. However, only one of the green channels may need to be decompressed to reconstruct an image. Decompressing only one channel allows for faster image reconstruction.

In some embodiments, not all of the quality levels are used for reconstruction of an image. As explained above, the compressed channels may not have the same number of quality levels. Upon reconstruction, a lower quality level for a channel may be chosen to, for example, allow for faster image reconstruction. In some embodiments, the channels are decompressed so that each decompressed channel has approximately the same quality level.

At block 64, a gamma function or power log curve may be applied to the decompressed channels. For example, the inverse of any of the pre-emphasis or gamma curves or other functions described above can be applied to the image data. In some embodiments, the applied function may be an identity function, meaning that the output is the same as the input, or no correction function may be applied at all.

In the operation block 66, the image is reconstructed from the decompressed data. In some embodiments, one or more green channels are demosaiced, and the demosaiced green channels are then used to reconstruct other channels. For example, a demosaiced green value can be used to reconstruct a red or blue value from a red-green or blue-green difference value that is at the same location as the demosaiced green value. In some embodiments, the other channels can be demosaiced without requiring the green channel to be demosaiced first. For example, a decompressed but not demosaiced green value can be used to reconstruct a red or blue value from a red-green or blue-green difference value that is located near the decompressed green value. As a further example, an average of decompressed but not demosaiced green values can be used to reconstruct a red or blue value from a red-green or blue-green difference value that is located near the averaged decompressed green values. The average can provide the same value as used for compression, or it can be any other average of green values. The red and blue values are demosaiced with any appropriate algorithm.

The demosaiced or reconstructed image data can be further processed. For example, but without limitation, noise reduction techniques, anti-aliasing techniques, or any other image processing technique can be applied to the image data.

What is claimed is:
1. An imaging device, comprising:
   a color filter array comprising at least red, green, and blue filter elements arranged in a repeating pattern;
   at least one image sensor that receives light passing through the filter elements and captures a plurality of image frames in a motion video image sequence, wherein an image frame comprises a red color portion, a blue color portion, a first green color portion, and a second green color portion;
   processing circuitry configurable to operate in a resolution-based mode to:
      transform the red color portion into a first red data set corresponding to a first resolution and at least a second red data set corresponding to a second resolution that is higher than the first resolution, wherein reconstruction of the red portion of the image frame at the first resolution is based on the first red data set and is independent of the second red data set, and reconstruction of the red image frame at the second resolution is based on the first red data set and the second red data set;
      transform the blue color portion into a first blue data set corresponding to the first resolution and at least a second blue data set corresponding to the second resolution, wherein reconstruction of the blue portion of the image frame at the first resolution is based on the first blue data set and is independent of the second blue data set, and reconstruction of the blue portion of the image frame at the second resolution is based on the first blue data set and the second blue data set;

transform the first green color portion into a first green data set corresponding to the first resolution and at least a second green data set corresponding to the second resolution, wherein reconstruction of the first green portion of the image frame at the first resolution is based on the first green data set and is independent of the second green data set, and reconstruction of the first green portion of the image frame at the second resolution is based on the first green data set and the second green data set;

transform the second green color portion into a third green data set corresponding to the first resolution and at least a fourth green data set corresponding to the second resolution, wherein reconstruction of the second green portion of the image frame at the first resolution is based on the third green data set and is independent of the fourth green data set, and reconstruction of the second green portion of the image frame at the second resolution is based on the third green data set and the fourth green data set;

compress the first red data set;
compress the second red data set;
compress the first blue data set;
compress the second blue data set;
compress the first green data set;
compress the second green data set;
compress the third green data set;
compress the fourth green data set;

organize the compressed data sets into at least a first arrangement of one or more data blocks that contains the compressed first red data set, the compressed first blue data set, and the compressed first green data set, and a second arrangement of one or more data blocks that are different from the first arrangement of data blocks and that contains the compressed second red set, the compressed second blue data set, and the compressed second green data set, wherein the first arrangement does not contain the compressed third green data set and the compressed fourth green data set; and store on a storage device the first arrangement of data blocks, at least a first location reference to the first arrangement of data blocks, the second arrangement of data blocks, and at least a second location reference to the second arrangement of data blocks.

2. The imaging device of claim 1, wherein the data blocks are contained in a file, with location references being offset indicators to blocks of data within the file structure.

3. The imaging device of claim 2, wherein location reference values that have neighboring numbers refer to adjacent blocks of data within the file structure.

4. The imaging device of claim 1, wherein the resolution based mode further operates to organize the compressed second red set, the compressed second blue data set, and the compressed second green data set in one or more blocks that are different from blocks that contain the compressed third green data set and the compressed fourth green data set.

5. The imaging device of claim 4, wherein the resolution based mode further operates to organize the third green data set in one or more blocks that are different from blocks that contain the compressed fourth green data set.

6. The imaging device of claim 1, wherein the resolution based mode further operates to transform the red, blue, first green, and second green color portions into data sets corresponding to a plurality of resolution levels, wherein reconstruction of a color portion of an image frame at a particular resolution is based on the color portion data sets corresponding to that resolution level and any color portion data sets corresponding to lower resolution levels.

7. A method of storing color image data, comprising:

electronically capturing a plurality of image frames in a motion video image sequence, wherein an image frame comprises a red color portion, a blue color portion, a first green color portion, and a second green color portion;

transforming the red color portion into a first red data set corresponding to a first resolution and at least a second red data set corresponding to a second resolution that is higher than the first resolution, wherein reconstruction of the red portion of the image frame at the first resolution is based on the first red data set and is independent of the second red data set, and reconstruction of the red image frame at the second resolution is based on the first red data set and the second red data set;

transforming the blue color portion into a first blue data set corresponding to the first resolution and at least a second blue data set corresponding to the second resolution, wherein reconstruction of the blue portion of the image frame at the first resolution is based on the first blue data set and is independent of the second blue data set, and reconstruction of the blue portion of the image frame at the second resolution is based on the first blue data set and the second blue data set;

transforming the first green color portion into a first green data set corresponding to the first resolution and at least a second green data set corresponding to the second resolution, wherein reconstruction of the first green portion of the image frame at the first resolution is based on the first green data set and is independent of the second green data set, and reconstruction of the first green portion of the image frame at the second resolution is based on the first green data set and the second green data set;

transforming the second green color portion into a third green data set corresponding to the first resolution and at least a fourth green data set corresponding to the second resolution, wherein reconstruction of the second green portion of the image frame at the first resolution is based on the third green data set and is independent of the fourth green data set, and reconstruction of the second green portion of the image frame at the second resolution is based on the third green data set and the fourth green data set;

compressing the first red data set;
compressing the second red data set;
compressing the first blue data set;
compressing the second blue data set;
compressing the first green data set;
compressing the second green data set;
compressing the third green data set;
compressing the fourth green data set;

organizing the compressed data sets into at least a first arrangement of one or more data blocks that contains the compressed first red data set, the compressed first blue data set, and the compressed first green data set, and a second arrangement of one or more data blocks that are different from the first arrangement of data blocks and that contains the compressed second red set, the compressed second blue data set, and the compressed second green data set, wherein the first arrangement does not contain the compressed third green data set and the compressed fourth green data set; and storing on a storage device the first arrangement of data blocks, at least a first location reference to the first arrangement of data blocks, the second arrangement of data blocks, and at least a second location reference to the second arrangement of data blocks.

8. The method of claim 7, further comprising transmitting to an image reconstruction device the first arrangement of data blocks without transmitting the second arrangement of data blocks.

9. The method of claim 8, further comprising transmitting to an image reconstruction device color portion data sets corresponding to the particular resolution level and any color portion data sets corresponding to lower resolution levels without transmitting color portion data sets corresponding to higher resolution levels.

10. The method of claim 7, further comprising transforming the red, blue, first green, and second green color portions into data sets corresponding to a plurality of resolution levels, wherein reconstruction of a color portion of an image frame at a particular resolution is based on the color portion data sets corresponding to that resolution level and any color portion data sets corresponding to lower resolution levels.

11. The method of claim 7, wherein the data blocks are contained in a file, with location references being offset indicators to blocks of data within the file structure.

12. The method of claim 11, wherein location reference values that have neighboring numbers refer to adjacent blocks of data within the file structure.

13. The method of claim 7, wherein organizing the compressed data sets comprises organizing the compressed second red set, the compressed second blue data set, and the compressed second green data set in one or more blocks that are different from blocks that contain the compressed third green data set and the compressed fourth green data set.

14. The method of claim 13, wherein organizing the compressed data sets comprises organizing the third green data set in one or more blocks that are different from blocks that contain the compressed fourth green data set.

* * * * *